Feb. 26, 1957    J. H. PAULICK, JR    2,783,461
COUNTER UNITS AND SYSTEM FOR MACHINE CONTROL
Filed Jan. 3, 1955
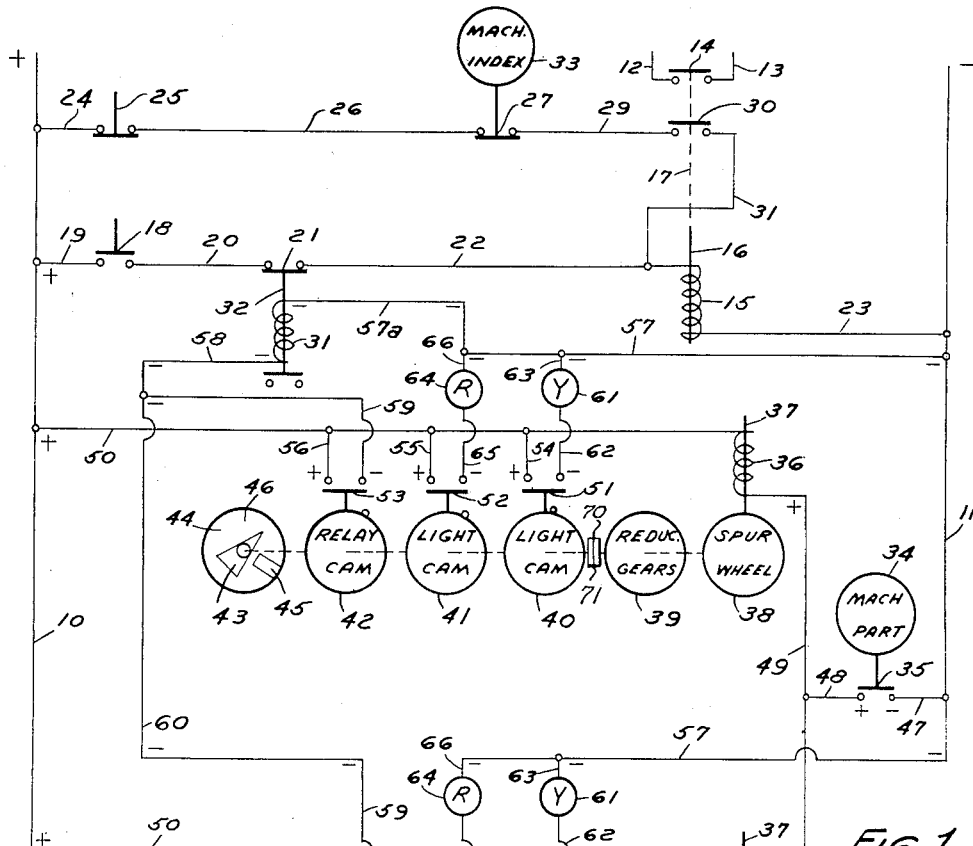
FIG. 1
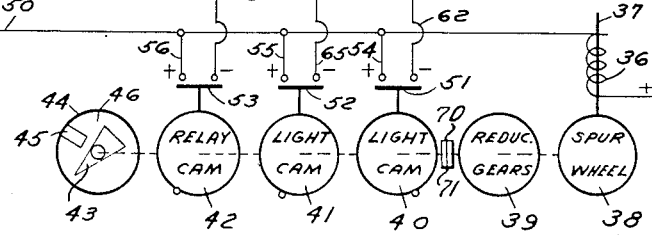
FIG. 2
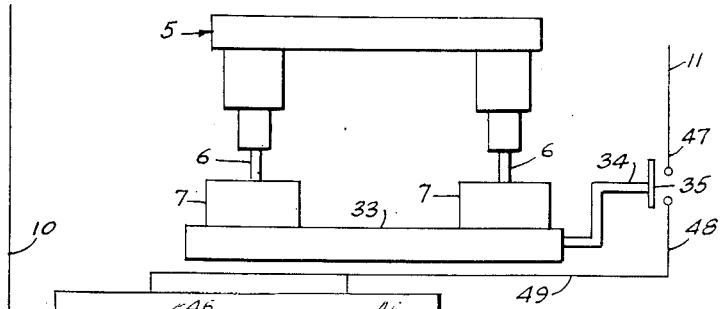
INVENTOR.
JOSEPH H. PAULICK JR.
BY Lillian P. Sevald
ATTORNEY

United States Patent Office 2,783,461
Patented Feb. 26, 1957

2,783,461

COUNTER UNITS AND SYSTEM FOR MACHINE CONTROL

Joseph H. Paulick, Jr., Birmingham, Mich.

Application January 3, 1955, Serial No. 479,281

16 Claims. (Cl. 340—267)

This invention relates to electrical counter devices, their combination with each other and machines controlled thereby and integrated therewith so that the machine controlled activates the counter units, and, the units, upon a definite predetermined count, control the system such as shutting down a machine tool after a certain number of operations and giving warning prior to shut down.

While counters and timers are well known in the art for doing certain operations, the devices of the prior art are too involved, indirect, and expensive to permit simple commercial use in that they are complicated in design and construction, expensive, difficult to use, replace, and repair, and are not easily used in conjunction with one another but are rather accepted as operating independently.

While some machine control systems are in use, they are so integrated that they are unnecessarily highly complicated in that they convert a count impulse to a time increment of set duration and then convert the set time duration increment back to a count, which is indicated in terms of machine tool operation. Obviously, the machine time can be calculated immediately from the count without the intermediate unnecessary steps of converting the count to time and the time back to count and then converting the count to time of indicated machine operation.

With the foregoing in view, it is a primary object of this invention to provide a simple, inexpensive, easy to understand, easy to use machine control system of counting devices, which counters are simple, inexpensive, and easy to understand.

An object of the invention is to provide a simple system which the ordinary mechanic can easily understand.

An object of the invention is to provide a system of a plurality of counters with each counter set to control the machine in relation to a certain tool or group of tools in relation to previously estimated tool life expectancy.

An object of the invention is to provide a system of integration with the machine tool having the plurality of various tools so that the machine will run to the end of the index operation upon a counter running to the end of the count.

These and other objects of the invention will become apparent by reference to the following description of the counters and systems embodying the invention taken in connection with the accompanying drawing, in which:

Fig. 1 is a schematic diagram of the counters, counter system, machine integration system, and index control system.

Fig. 2 is a showing of a machine system embodying the invention.

Referring now to the drawing, wherein like numerals refer to like and corresponding parts throughout the several views, the machine 5 control system, machine system, counter, counter circuits, and switches integrated in the systems disclosed therein to illustrate the invention comprise positive control circuit lead 10 and negative control circuit lead 11, machine power circuit leads 12 and 13 and a switch 14 disposed therebetween the leads 12 and 13 to turn on and off the power to drive the machine. Relay coil 15 is adapted to move the armature 16 to close the switch 14 via the mechanical connection 17 when the coil 15 is energized. The machine control start circuit comprises a start switch 18 disposed between the leads 19 and 20, a relay operated switch 21 disposed between the leads 20 and 22, and a lead 23 connecting through the coil 15 with the lead 11. It is to be noted that the leads 19, 20, and 22, and 23 are connected across the control leads 10 and 11 via the switches 18, 21 and the relay coil 15.

The machine 5 stop circuit is connected between the leads 10 and 11 by the lead 24 stop switch 25, lead 26, index operated switch 27, lead 29, the relay operated switch 30, and the lead 31 connected to the lead 22 and through the coil 15 and lead 23.

The operation of the device so far described is such that the normally closed stop switch 25 and the normally closed index switch 27 normally pass energy through the coil 15 to close same in the event the switch 30 is closed but when the machine is not operating, the switch 30 is open, thereby breaking the connection in the stop circuit.

The operation of the start shunt circuit is such that when the normally open start switch 18 is closed, energy passes through the coil 15 in that the relay operated switch 21 is normally closed thereby closing the switch 30 by energizing the coil 15. Under the normal operating conditions, the machine is energized by both the start and stop circuits of the machine 5 control. The machine will continue to run until both the start and stop circuits are broken at the same time and this occurs when the relay coil 31 is energized to move the armature 32 to open the switch 21 thereby de-energizing and disconnecting the start circuit of the machine; however, the coil 15 remains energized to hold the switch 30 closed so as to keep itself self-energized until the machine index 33 moves to a point to open the switch 27 whereupon the coil 15 is de-energized and the switch 30 opens in the control circuit and the switch 14 opens in the machine power circuit.

The relay coil 31 is powered by the operation of the counter mechanisms which are electrically operated through impulses initiated by the movement of the machine part 34 to close the switch 35 as hereinafter more fully described.

Each counter mechanism comprises a solenoid coil 36, an armature 37, adapted to be moved by the coil 36, a spur wheel 38 adapted to be moved by the armature 37, a gear reduction train 39 adapted to be driven by the spur wheel 38, light cams 40 and 41 adapted to be driven by the reduction gear train 39, the relay cams 42 and indicators 43 also adapted to be driven by the reduction gear train 39 and in the instance of the indicators 43, they are driven relative to the dials 44 to give progress indication between the adjustable stop 45 and the terminal point 46. The lead 47 connects one side of the machine part operated switch 35 to the negative lead 11 and the lead 48 connects the other side of the switch 35 to the series lead 49 to the solenoid coils 36 on one side thereof and the common leads 50 connect the other side of the solenoid coils 36 to the positive lead 10 so that each time the machine part 34 closes the switch 35, the solenoid coils 36 will each be energized to move the spur wheels 38 one increment of movement.

The light cams 40 are adapted to operate the warning light switches 51, the stop light cams 41 are adapted to operate the stop switches 52, and the relay cams are adapted to operate the relay switches 53. The leads 54, 55, and 56 respectively connect one side of the switches 51, 52, and 53 to the common lead 50 and the leads 57 and 57A connect one side of the relay coil 31 to the negative lead 11 and the leads 58, 59, and 60 lead from the other side of the relay coil 31 are connected to the other side of the relay cam switches 53 in parallel so that when one switch 53 closes, the relay coil 31 is energized to move the armature 32 to open the switch 21 in the machine start circuit. The yellow warning lights 61 are connected to one side of the switches 51 by the leads 62 and are connected to the leads 57 by the leads 63 so that when any one warning light switch 51 is closed, the individual yellow light is associated therewith and will light up. The red stop lights 64 are disposed in the stop light switch circuits 52 via the leads 65 and 66 connecting between the leads 57 and the switch 52 so that when any one switch 52 is selectively closed, the individual stop light 64, associated therewith, will be lit up. A frictional slip connection is disposed between the reduction gears 39 and the shaft driving the cams and indicator so that the reduction gears can drive the cams and indicators and so that the indicators can be manually moved without the necessity of driving the reduction gear trains in reverse which is usually impossible.

The counter comprises the solenoid coil 36, armature 37, spur wheel 38, reduction gears 39, light cam 40, light cam 41, relay cam 42, indicator 43, dial 44, and switches 51, 52, and 53. Friction clutch elements 70 and 71 are disposed between the reduction gears 39 and the cams 40—42 and indicator 43 to eliminate reversely driving the gear train 39 in resetting the indicator 43 and cams 40—42. As many of these counter units can be used as desired and there has been integrations of such counters upward of fifty counters for 50 different tools or sets of tools of different calculated estimated life spans. The integration of the additional counter units to the system is a matter of simply duplicating the second counter of the system as shown on the drawing.

Each tool 6, or set of tools of different life span calculated expectancy relative to the workpieces 7 is associated with one counter unit and the reduction gear train 39 of the unit is adapted to drive the indicator 43 from the adjustable stop 45 to the terminal point 46 as a function of reducing the rotational movement as powered by the number of times the machine part 34 closes the switch 35 to energize the solenoid coil 36 to power the armature 37 to move the spur wheel one increment of movement. So that if a machine 5 or set of tools 6 has a life expectancy of so many hours, so many machine part movements, or so many operations of the tools as used in the machine, the life expectancy of the tools in terms of time or machine part operations or indexed operations can be integrated through the movement of the machine part 34 and the selected gear train 39 to move the indicator 43 from the stop 45 to the terminal point 46 and the cams a like distance to operate the yellow light 61 and the red light 64 and the relay coil 31. The light cams 40 have their lobes for operating the switches 51 advanced relative to the lobes on the cams 41 and 42 so that the yellow light 61 turns on and warns the machine operator the life expectancy of the tool or set of tools connected with that particular indicator or counter unit is approaching the end of its life term of expectancy span. When the lobes on the cams 41 and 42 close the switches 52 and 53 turning on the red light and shutting down the machine, the operator is advised by locating the red light as to which set of tools or tool has reached the end of its life expectancy and must be changed prior to again setting the machine in operation.

The operation of the device as previously described in connection with the counter units is controlled by the counter units and the intermittent motion of the machine part 34 to close the switch 35 to energize the counter units is as follows: The machine is started by closing the start switch 18 whereby the coil 15 is energized moving the armature 16 to close the control switch 30 and the power switch 14 whereby the machine starts in motion and it is to be noted that the lead 31 is through the coil 15 so that the switch 30 remains closed as long as the coil 15 is energized and the coil 15 remains energized as long as the switch 30 is closed, due to the fact that the stop switch 25 and the machine index switch 27 and the relay operated switch 21 are all normally closed. During the operation of the machine, the machine part 34 reciprocates to operate the switch 35 to give the solenoid coils 36 intermittent power whereby the armatures 37 move the spur wheels 38 one increment of space for each time the machine part closes the switch 35, and, in this connection it is to be noted that the dwell of the machine part in closing the switch 35 is not important in that it can be any amount of time in that the coils 36 once energized to move the spur wheel 38 one increment of space will not again move the spur wheel until they have been first de-energized to make another stroke.

In this fashion, the armatures 37 drive the spur wheels 38 and the spur wheels 38 drive the reduction gears 39 which in turn drives the clutch elements 70 and 71 to move the light cams from the position of the adjustable stop or the estimated full life span of the tool or set of tools to appoint to close the switches 51, 52, and 53 and as previously described, the indicator 43 gives the operator visual progress indication of the cams and their relative position to the switches. When the cams 40 approach the switches 51, the lobes finally come in contact with the switches 51, the switches 51 or any one of them will close the contacts between one set of leads 54 and 62 thereby lighting up the individual yellow light giving the operator a reminder indicator that that particular set of tools is approaching the termination point of its life expectancy. Upon further movement of the cams, the lobes of the cams 41 and 42 will engage the switches 52 and 53 to close the contacts therebetween to light the individual red light 64, and to energize the relay coil 31 thereby moving the armature 32 to open the switch 21 thereby breaking the start control shunt circuit of the machine, which does not, however, de-energize the relay coil 15 in that the stop circuit still energizes the relay coil 15 and the machine will continue to run until the machine index opens the switch 27 whereby the coil 15 is de-energized and the switches 30 and 14 open thereby shutting off the machine control and power circuits, at this point, the operator changes the tools or sets of tools as indicated by the red lights associated therewith and resets the indicators and cams for a full life span of the new tools installed in the machine, and, it has been found advisable to also change all the tools or sets of tools which have yellow lights lit in association therewith, thereby saving down time of the machine in that it usually takes longer to shut the machine down that to replace the tools and it is found advisable to change all the tools that are approaching the end of their life span at this time.

After the tools have been changed, the operator resets the indicators 43 relative to the dials 44 via slippage in the clutch elements 70 and 71 and this frees the switches 53 to de-energize the relay 31 so that the switch 21 is closed, whereupon the operator closes the start switch 18 powering the machine control relay 15 to close the switches 30 and 14 thereby powering the machine for further operation.

While it is well recognized that the counters or the systems indicated here will not actually detect when the tools are dull or approaching the end of their life expectancy, they will at least give a warning on a pre-calculated or theoretically estimated basis as integrated into the systems and the machines and the inventive counters and systems associated therewith provide an easy, understandable, and easily associated means for giving the operator a scale or a system for changing his tools upon his previously calculated basis.

When it has been found through use that some tools become dull sooner than previously calculated, the adjustable stop 45 can be reset relative to the dial so as to shorten the calculated estimated life span, whereas conversely, in the event that the tools remain sharper longer than previously estimated, the adjustable stops 45 can be moved further away from the terminal point 46 thereby allowing an additional increment of life span before the indicator associated therewith will give a warning and shuts down a machine indicating that that particular set of tools has reached the end of its estimated life.

Although but a single embodiment of the invention has been shown and described in detail, it is obvious that many changes may be made in the size, shape, detail, and arrangements of the elements of the invention within the scope of the pending claims.

I claim:

1. Apparatus for systematizing tool changes for a machine tool of the type having a tool adapted to perform certain work on a workpiece a pre-estimated number of times and including a machine part operable in synchronized relation to the number of times the tool does certain work on a workpiece including a counter unit comprising a solenoid motor, a spur wheel driven by said motor, a gear train driven by said wheel, a warning light switch cam driven by said gear train, a stop light switch cam driven by said gear train, a relay switch cam driven by said gear train, an indicator driven by said gear train, a dial disposed relative to said indicator, and switches operated by said cams.

2. In a device as set forth in claim 1, leads from one side of said switches and motor in a common circuit, and individual leads from the other side of said switches and motor.

3. In a system of two or more devices as set forth in claim 2, said devices having different ratio gear trains, the leads connected in parallel relative to said light switches so as to turn on lights individually, and leads connected in series relative to said relay switches so that any one relay switch can operate a relay.

4. In a system as set forth in claim 3, a reciprocating part of the machine controlled adapted to move intermittently and a switch in said common lead circuit adapted to be closed by said machine part to energize said solenoid motors once for each machine part movement.

5. In a system as set forth in claim 4, a machine control start circuit, a relay in said start circuit adapted to be energized by any one relay cam switch to stop machine operation.

6. In a system as set forth in claim 5, a machine control shunt stop circuit, a switch in said stop circuit adapted to be operated, a machine index adapted to operate said stop circuit switch so as to by pass said start circuit until the machine has reached the end of its index cycle.

7. A machine control system comprising a machine, a plurality of tools on said machine of various life span expectancies, a power circuit for said machine, a switch in said power circuit, a control circuit for said machine, a first relay in said control circuit adapted to close said switch in said power circuit when energized, a normally closed stop switch in said circuit for manually stopping said machine, a shunt control start circuit for said machine, a normally open start switch in said shunt circuit, a normally closed relay operated switch in said shunt circuit, a second relay adapted to open said normally closed switch when energized, solenoid motors connected in parallel, a switch for energizing said motors, a reciprocating machine part adapted to intermittently close said switch to energize said motors each time said part reciprocates, spur wheels adapted to be driven by said solenoid motors, gear trains of varied ratio adapted to be driven by said spur wheels, relay switch cams adapted to be driven by said gear trains, and switches adapted to be closed by said relay cams, said relay cam switches being connected in parallel with said second relay to individually energize said second relay to break said machine control shunt circuit so that said machine control circuit can be broken by the next operation of said machine index to open said index operated switch.

8. In a system as set forth in claim 7, warning light cams and stop light cams adapted to be operated by said gear train, dials, and indicators, adapted to be driven by said gear trains relative to said dials to give progress indication; said cams being adapted to be manually rotated by said indicator for resetting and adjusting.

9. Apparatus for systematizing tool changes for a machine tool of the type having a tool adapted to perform certain work on a workpiece a pre-estimated number of times and including a machine part operable in synchronized relation to the number of times the tool does certain work on a workpiece, comprising a counter unit including a solenoid motor, a spur wheel driven by said motor, a gear train driven by said wheel, a warning light switch cam driven by said gear train, a termination light switch cam driven by said gear train, a relay switch cam driven by said gear train, an indicator handle driven by said gear train, switches operated by said cams; lights connected to said light switches; and a machine circuit relay connected to said relay switch; said warning light designating when a certain count remains of the pre-estimated number of times the tool can do work on the workpiece without sharpening; said termination light designating when the pre-estimated count of the number of times the tool will do certain work on a workpiece without sharpening has been reached; said relay switch being adapted to operate at the same time as said termination light switch to operate said relay in the machine to disconnect power to the machine when the pre-estimated count of a tool has been reached; said indicator being adapted to be manually rotatable to reset said switches upon a new tool being mounted in the machine.

10. In a device as set forth in claim 9, leads from one side of said switches and motor in a common circuit, and individual leads from the other side of said switches and motor.

11. In a system of two or more devices as set forth in claim 10, said devices having different ratio gear trains, the leads connected in parallel relative to said light switches so as to turn on lights individually, and leads connected in series relative to said relay switches so that any one relay switch can operate said relay.

12. In a system as set forth in claim 11, a reciprocating part of the machine controlled and a switch in said common lead circuit adapted to be closed by said machine part to energize said solenoid motors once for each machine part movement.

13. In a system as set forth in claim 12, a machine control start circuit, a relay in said start circuit adapted to be energized by any one relay cam switch to stop machine operation.

14. In a system as set forth in claim 13, a machine control shunt stop circuit, a switch in said stop circuit adapted to be operated, a machine index adapted to operate said stop circuit switch so as to by-pass said start circuit until the machine has reached the end of its index cycle.

15. Apparatus for systematizing tool changes for a machine tool of the type having a tool adapted to perform certain work on a workpiece a pre-estimated number of times and including a machine part operable in synchronized relation to the number of times the tool does certain work on a workpiece, comprising a counter unit including a solenoid motor, a spur wheel driven by said motor, a gear train driven by said wheel, a warning light switch cam driven by said gear train, a termination light switch cam driven by said gear train, an indicator handle driven by said gear train, switches operated by said cams; lights connected to said light switches; said warning light designating when a certain count remains of the pre-estimated number of times the tool can do work on the workpiece without sharpening; said termination light designating when the pre-estimated count of the number of times the tool will do certain work on a workpiece without sharpening has been reached when the pre-estimated count of a tool has been reached; said indicator being adapted to be manually rotatable to reset said switches upon a new tool being mounted in the machine.

16. Apparatus for systematizing tool changes for a machine tool of the type having a tool adapted to perform certain work on a workpiece a pre-estimated number of times and including a machine part operable in synchronized relation to the number of times the tool does certain work on a workpiece, comprising a counter unit including a solenoid motor, a spur wheel driven by said motor, a gear train driven by said wheel, a warning light switch cam driven by said gear train, a relay switch cam driven by said gear train, an indicator handle driven by said gear train, switches operated by said cams; a light connected to said light switch; and a machine circuit relay connected to said relay switch; said warning light designating when a certain count remains of the pre-estimated number of times the tool can do work on the workpiece without sharpening; said relay switch being adapted to operate said relay in the machine to disconnect power to the machine when the pre-estimated count of a tool has been reached; said indicator being adapted to be manually rotatable to reset said switches upon a new tool being mounted in the machine.

References Cited in the file of this patent
UNITED STATES PATENTS

| | | |
|---|---|---|
| 2,346,869 | Poole | Apr. 18, 1944 |
| 2,440,480 | Lewis | Apr. 27, 1948 |
| 2,679,038 | Cross et al. | May 18, 1954 |